Patented Nov. 15, 1938

2,136,572

UNITED STATES PATENT OFFICE 2,136,572

OZONIZER

Herbert A. Winkelmann and Albert Baird Fridaker, Chicago, Ill., assignors to Marbon Corporation, a corporation of Delaware No Drawing. Application March 20, 1936,
Serial No. 69,880

5 Claims. (Cl. 204—32)

This invention relates to electrical capacitors and more particularly to ozone generators. It comprises condensers and ozone generators provided with an improved dielectric material.

One object of this invention is to provide an improved type of capacitor.

Another object of this invention is to provide an ozonizer giving a more efficient and economical production of ozone.

Another object is to provide a pure ozone substantially free of oxides of nitrogen.

Another object is to provide an ozonizer which will withstand long and hard usage without the necessity for replacement of dielectric plates and electrodes due to breakage, or the oxidizing effect of ozone.

A further object is to provide good ozone production with relatively low voltages.

A further object is to provide a dielectric which can be used in very thin form without danger of breakage, thereby making possible the production of a more compact ozonizer or other electrical capacitor.

Another object is to provide a dielectric which will be resistant to penetration by ozone vapor, and also resistant to oxidation by ozone.

A further object is to provide an ozonizer in which the temperature of the plates and air between the plates remains relatively cool during ozone production.

These and other objects which will hereinafter become apparent are obtained by the use of a dielectric comprising rubber hydrohalides.

The preferred dielectric consists essentially of rubber hydrochloride, preferably stabilized against heat decomposition by means of magnesium oxide, lead oxide, barium hydroxide, barium oxide, or other stabilizer as described in the copending application of Herbert A. Winkelmann, Serial No. 11,665, filed March 18, 1935, now Patent 2,046,986.

The ozone generator is a type of electrical capacitor or condenser comprising electrodes and dielectric plates in which the dielectric plates instead of being in contact with each other as in condensers, are spaced apart leaving an air space between them through which an electrical discharge known as a silent discharge or corona effect takes place, resulting in a conversion of the oxygen of the air gap into ozone.

The ozone generator may comprise a series of spaced ozonizer elements, comprising dielectric plates having embedded and enclosed therein electrodes, a portion of which extends to form terminals which are connected through a transformer to a source of electrical energy. The discharge between the ozone elements, therefore, will take place from dielectric to dielectric. However, although this is the preferred arrangement and results in advantages, as for example, the protection of the electrodes from the ozonizing action of the ozone, it is not necessary that the electrodes and dielectric be thus arranged, but they may be so arranged that the discharge will take place from dielectric to electrode, or even from electrode to electrode through an air gap, although the latter arrangement gives very poor results.

The preferred ozonizer elements comprise an electrode embedded and enclosed in a dielectric composed of rubber hydrochloride. The complete element gives good ozone production for 4000 volt operation when it is approximately .062" thick, and contains an electrode of .042" thickness spaced equidistant from the dielectric surfaces so that there is approximately .01" of dielectric on each generating surface. These ozonizing elements are spaced approximately $\tfrac{1}{16}$" apart, thereby forming a series of air gaps in which ozone is generated.

The proportions stated are for purpose of illustration and may vary widely. However, it is an advantage of the dielectric material of this invention that it can be readily molded and made in thin form. This results in the possibility of operating at relatively low voltages, and the cool and efficient production of pure ozone. Higher voltages such as 7500 volts may be used up to the point where sparking is excessive. With greater thickness of dielectric the voltages are necessarily increased to obtain good ozone production.

With glass dielectrics the use of very thin plates is impractical due to breakage. Furthermore, the conductivity of glass increases with increase in temperature and varies considerably during runs due to the formation of hot spots. Mica is also not highly satisfactory due in part to the splitting of the laminations. Furthermore the complete enclosure or enveloping of metal electrodes by glass or mica is not practical. Moldable materials such as Bakelite and cellulose acetate although capable of being molded around electrodes so as to give good protection against ozone are not highly satisfactory from the point of view of efficient ozone production. Poor yield or concentration of ozone, puncturing of plates and the like are obtained with many materials which might be used as a dielectric for ozonizers, including materials having high dielectric strength which ordinarily might be expected to give good results. In order to be satisfactory a dielectric in an ozone machine must produce ozone satisfactorily and continue to do so for a reasonable length of time, i. e., at least 1000 hours.

We have found that by the use of a heat stabilized rubber hydrochloride as a dielectric the ozonizer can be run continuously for over 1000 hours without artificial cooling, or drying of the air. Plates of rubber hydrochloride of .01" thickness and less may be used. Throughout such adverse conditions 50 grams of ozone per kilowatt hour can be readily obtained.

It is not entirely understood why rubber hydrochloride gives superior results. The material has such plastic properties that it flows and does not warp or break on expansion and contraction of the embedded electrode. It is highly resistant to penetration by vapor and also resistant to oxidation. Rubber hydrochloride of $\frac{1}{16}$ inch thickness shows breakdown voltages of 925 volts per mil. or 36,400 volts per m. m. It has a dielectric constant of 3.70, a power factor of .005 and specific resistance in ohms per cm3 of $10 \times 10^{12}$. However, many materials have higher dielectric strength than rubber hydrochloride, but fail due to heating, so that low leakage is also imperative. Another important item is that the dielectric should be free from surface charges as this too will cause heating. Rubber hydrochloride seems to have the necessary qualifications not only for ozone production but for other electrical uses as, for example, a dielectric in ordinary condensers, and as a general insulator.

Although plates of straight unmodified rubber hydrochloride can be used with fair results, the best results are obtained by the use of a heat stabilized rubber hydrochloride composition. A composition composed of rubber hydrochloride 100 parts by weight, magnesium oxide 5-30 parts by weight, gives good ozone production over an extended period of time. The magnesium oxide acts as a stabilizer against heat decomposition of the rubber hydrochloride. The addition of around 1% or so of hexamethylene tetramine with the magnesium oxide is also of advantage. The addition of other heat stabilizers than magnesium oxide as, for example, lead oxide, barium hydroxide, barium oxide may be done. Barium oxide, particularly when mixed with magnesium oxide is a very satisfactory compounding agent. In general the best stabilizers for rubber hydrohalides for ozone purposes are basic or hydrogen chloride reactive metal oxides other than zinc oxide, and particularly the metal oxides which form non-hygroscopic halides.

Other rubber hydrohalides than rubber hydrochloride may be used, as for example rubber hydrobromide. The rubber hydrohalides are preferably saturated or nearly saturated.

Dielectrics for ozonizers which compare favorably with glass and mica, although in general not as good as a rubber hydrohalide dielectrics are obtained by using rubber chloride, chlorinated rubber chloride, and vinyl chloride. These materials, however, are difficult to mold, are apt to be brittle, and in other respects are inferior to the rubber hydrohalides. Other plastic insulating materials which are resistant to ozone and resistant to penetration by ozone vapor, such as vinyl acetate, polymerized chloroprene, although not particularly efficient as dielectrics in ozone generators are operable.

Dielectrics in other than plate form may be made, as for example cylindrical form. Various modifications in shapes, proportions, and other details may be made without departing from the principle of this invention. The amounts of heat stabilizer may vary widely. With barium oxide, particularly, the amount may even be in excess of the hydrogen halide, without decreasing the efficiency, as for example 150 parts by weight of barium oxide per 100 parts of rubber hydrochloride. The thickness of the plates may also vary widely. In general, however, the rubber hydrohalides are adaptable for efficient use in very thin form, as for example .005" and thus have an advantage over other materials which cannot be used in such thin form without puncturing or splitting.

Paper may be impregnated with rubber hydrochloride, laminated together so that an electrode is embedded in the laminated sheet, and used with fair results as an ozonizer element, although such a laminated element is not a preferred embodiment of this invention.

We claim:

1. In an ozonizer, an electrical assembly comprising at least two electrodes having a dielectric therebetween composed essentially of a rubber hydrochloride.

2. In an ozonizer, an electrical assembly comprising at least two electrodes having a dielectric therebetween composed essentially of an intimate mixture of a rubber hydrochloride and a basic stabilizer.

3. In an ozonizer, an electrical assembly comprising at least two electrodes having a dielectric therebetween composed essentially of an intimate mixture of rubber hydrochloride and lead oxide.

4. In an ozonizer, an electrical assembly comprising at least two electrodes having a dielectric therebetween composed essentially of an intimate mixture of rubber hydrochloride and magnesium oxide.

5. In an ozonizer, an electrical assembly comprising at least two electrodes having a dielectric therebetween composed essentially of an intimate mixture of rubber hydrochloride and barium oxide.

HERBERT A. WINKELMANN.
ALBERT B. FRIDAKER.